T. ZABROCKI.
MAGAZINE CAMERA.
APPLICATION FILED APR. 14, 1911.

1,032,098.

Patented July 9, 1912.
6 SHEETS—SHEET 1.

Witnesses
W. A. Williams
R. L. Norton

Inventor
Tony Zabrocki.
By Crowel & Phelps.
Attorneys

UNITED STATES PATENT OFFICE.

TONY ZABROCKI, OF WINONA, MINNESOTA.

MAGAZINE-CAMERA.

1,032,098. Specification of Letters Patent. Patented July 9, 1912.

Application filed April 14, 1911. Serial No. 620,998.

*To all whom it may concern:*

Be it known that I, TONY ZABROCKI, a citizen of the United States, residing at Winona, in the county of Winona and State of Minnesota, have invented certain new and useful Improvements in Magazine-Cameras, of which the following is a specification.

This invention relates to improvements in photographic cameras, and particularly to improvements upon the magazine camera forming the subject of Letters Patent No. 990,941 granted to me May 2, 1911.

The principal objects of the present invention are to improve the action and the accuracy of cameras of this sort and to add certain safeguards thereto.

Therefore the invention consists in the structure of parts and in their combination, substantially as hereinafter described and claimed.

In the accompanying drawings which form a part of this specification, Fig. 10 represents in perspective the vertically operating division-curtains; Fig. 11 represents in like manner the horizontally operating division-curtains; Fig. 12 is a detail in perspective of one of the indicators and safety attachments of the present invention.

In order to clearly disclose the importance of the improvements and additions made to the camera attachment of the patent mentioned above, a brief description of the principal features of said attachment will be given. For a more detailed description attention is especially directed to said patent.

Figures 6, 7, 8:
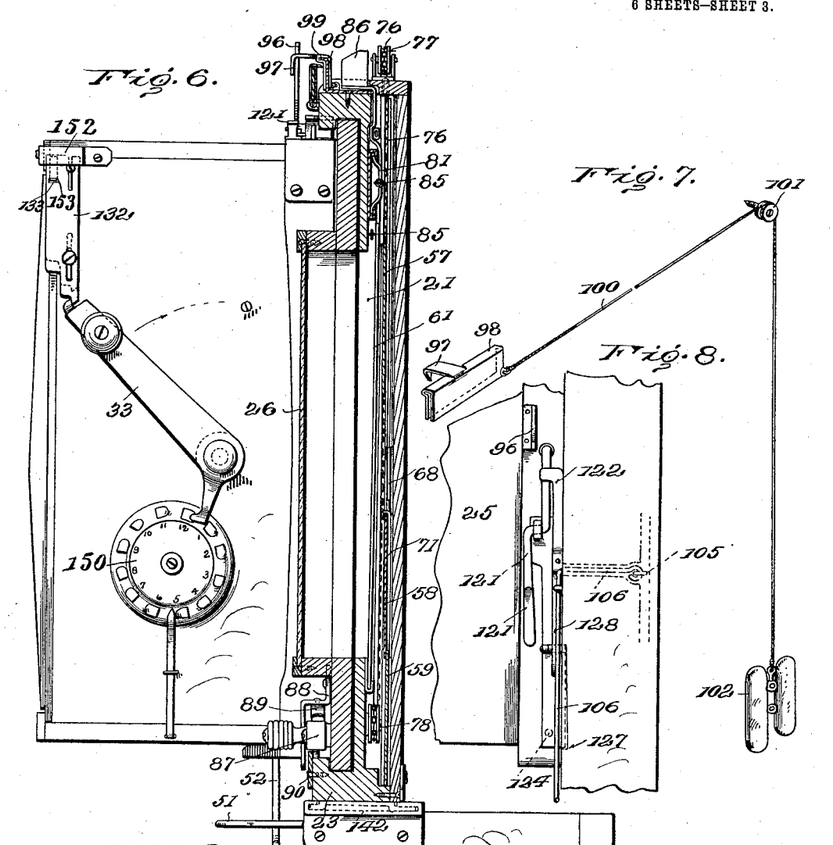
Fig. 6 represents a vertical transverse section through the device, taken in the plane indicated by the line 6—6, Fig. 1.
Figs. 7 and 8 represent in detail other features of the present invention.
Figure 9:
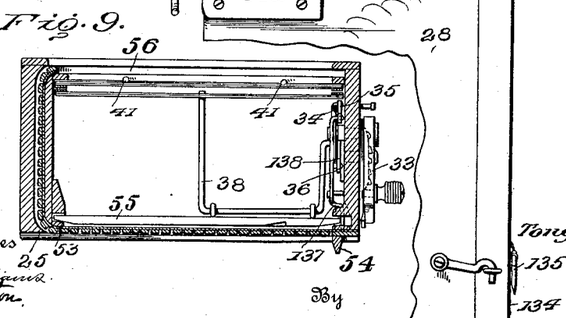
Fig. 9 is a horizontal section through the magazine, taken in the plane indicated by the line 9—9, Fig. 1.

In the invention disclosed in my prior patent, above mentioned, a main frame as 20 is constructed for attachment to the back of a camera, an opening therein indicated at 21, Fig. 6, being placed in registry with the object-lens. At the rear side of the main frame 20 are upper and lower rails 22 and 23, in which ways are formed to accommodate the slide frame 24. Upon this slide frame the magazine 25 is mounted near one end and near the other end the focusing-glass 26, to register with the opening 21. The magazine is made removable and a socket 27 is attached to the slide frame 24 for receiving it, and devices are provided in this socket for holding the magazine in place. To the main frame 20 is also detachably connected the dark-box 28, a slit 29 being formed through the lower rail 23 at the socket 27 through which plates may be passed from the magazine into the dark-box, the dark-box having a slit 30 in its top registering with the slit 29. In the drawings there are also illustrated the sensitized plates 31 in position in the magazine, Figs. 13 and 16, and in the dark-box are represented at 32 two exposed plates. The plates are shifted from the magazine to the dark-box through the instrumentality of the crank 33 and a certain escapement apparatus operated by said crank. This escapement apparatus is seen in detail in Fig. 14 and consists of the arm 34 to which crank 33 is directly attached, links 35 and 36 with which are connected crank arms 37 and 38, which crank arms engage at their opposite ends with the escapement frames 39 and 40, respectively. To these frames pins as 41 and 42, respectively, are connected and these pins pass through vertical holes in the ends of the plate supports and guides indicated at 43 and 44, respectively. All the features of this escapement are represented in the prior patent and need no further description here. By the manipulation of the crank 33 one exposed plate after another is allowed to escape from the pins 41, 42 and descending strike upon the plate shift 45, Fig. 13, which directs them through the slits 29 and 30 into the dark-box 28. A tally of the number of exposed plates discharged from the magazine is kept by the indicator 150 bearing the numbers 1 to 12, Fig. 6, the same as in the patent above mentioned. They are received in the dark-box upon a spring support 46 and rest against the ends of side springs 47 until, by the manipulation of crank arms indicated at 48, they are forced back against the plate 49 pressed forward by the spring 50 located between said plate and the back of the dark-box. The manipulation of the crank arms 48 is effected through the crank 51, which projects rearward from the dark-box and lies in the path of a trip arm 52, attached to the socket 27 of the magazine. As the slide frame 24 is pushed to the left (Fig. 1) to bring the magazine over the dark-box the trip arm 52 rides over the crank 51, but in returning the slide frame 24 to the right to bring the magazine in line with the object-lens the trip arm strikes the crank 51 and forces the exposed plate just inserted into the dark-box back against the spring 50 to make room for the next exposed plate. All this is clearly and fully delineated in the patent above referred to and forms no part of the present invention. Two other features of said prior patent with which the present improvements are associated are the flexible dark-slide 53, Fig. 9, with its operating cleat 54, and the back door 55 of the magazine. The flexible dark-slide 53 is for closing the front of the magazine and for that purpose it is made to slide in the grooves 56, Fig. 13.

In the device of my patent above mentioned, a series of curtain-slides having apertures of different dimensions were employed to regulate the amount of exposure to be made upon a plate. In the present invention these curtain-slides are replaced by division-curtains which give far better results and provide for a greater variation in the manner of making exposures upon a single plate. These division-curtains are shown in detail in Figs. 2, 10 and 11. They consist of a set of vertically operating thin plates 57, 58 and 59 and a pair of horizontally operating thin plates 60 and 61. By the curtains 57, 58 and 59 exposures may be taken horizontally across the sensitized plates through any desired vertical distance, and by the manipulation of the division-curtains 60 and 61 exposures may be taken vertically of the sensitized plates to any desired extent horizontally. In effecting this, of course, the slide frame 24 will be moved in a manner to place the magazine at different positions with respect to the opening 21. The vertical manipulation of the division-curtains 57, 58 and 59 may be provided for in various ways. The drawings illustrate one way of doing this, in which the curtain 57 has its left end located in a groove formed by the curved plate 62, and its right end so formed as to constitute a slide adapted to the ways formed by the overturned edges of the plate 63. The curtain 58 is formed similarly to curtain 57 with the exception that its right edge as at 64 engages a single groove formed by the curved plate 65, while its left edge is shaped to form a slide as at 66 adapted to ways formed by the overturned edges of the plate 67. The division-curtain 59 rides upon the division-curtain 58. To effect this, ways 68 and 69 are secured to the curtain 58 and in these ways slide vertical extensions 70 and 71 integral with the ends of the curtain 59. The upper ends of these extensions 70 and 71 are overturned and hook over the upper edge of the curtain 58 so that as curtain 58 is raised curtain 59 will be raised with it as soon as the upper edge of the former engages said hooks and in the descent of the curtains 58 and 59 as soon as the latter strikes the bottom of its chamber the curtain 58 can slide down by the side of it. For the vertical movement of the division-curtain 57 any flexible device, as for instance a chain 72, may be attached at its ends to the slide 73 on the end of said division-curtain and made to pass over pulleys 74, mounted upon the upper edge of the main frame 20, and a pulley 75 mounted at the lower end of the plate 63. The vertical movement of the curtain 58, with its rider 59, may be effected by a similar device consisting of a chain 76 connected at its ends to the slide 66 of curtain 58 and made to pass over pulleys 77 mounted upon the upper edge of the main frame 20 and a pulley 78 mounted at the lower end of the plate 67.

The horizontally operating division-curtains 60 and 61 have their lower ends located in a guide 79, while on their upper ends are formed slides 80 and 81, respectively, adapted to run in a guide 82. At the ends of the guide 82 are located pulleys 83 and 84, over which passes a flexible connection as chain 85, interrupted at two different places for attachment to the curtain 60 and the slide 81 of curtain 61, respectively. Projecting upwardly from curtain 61 is a finger-piece 86, by the movement of which to right or left the curtains 60 and 61 are made to recede from or approach each other. This finger-piece, as seen in Figs. 1 and 6, extends above the main frame 20.

Figures 1, 18, 19:
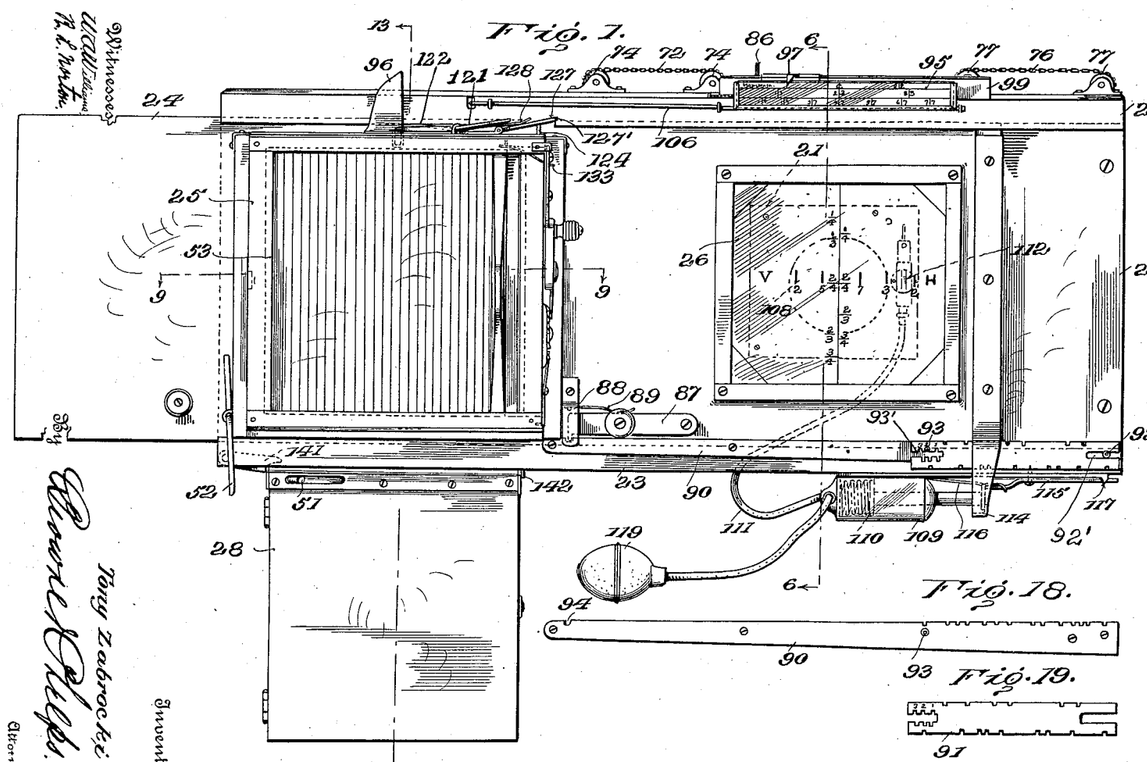
Figure 1 represents a rear view of the device forming the principal feature of the invention covered by the patent above mentioned, together with the improvements and additions made thereto in the present application.
Figs. 18 and 19 are elevations of parts forming the changeable stop rack.

To determine the position at which the magazine shall be stopped at the rear of the exposure opening 21 a detent 87 is pivoted to the slide frame 24, Fig. 1. The movable end of this detent is located behind the clip 88, within which is mounted a plate-spring 89 for pressing down the detent 87. The point of the detent is intended to ride along upon the upper edge of the rail 23 until it reaches certain notches provided for it and for the stopping of the magazine at predetermined points. It is preferable to provide a rack, such for instance as indicated at 90, in which said notches may be formed. This rack, Fig. 18, is attached to the rail 23 and projects above the rail for a distance equal to the depth of the notches in its upper edge. Associated with the rack 90 is a shorter rack 91 having notches on both edges. This second rack is supported against the face of the first by means of a headed pin 92 at the right end and another headed pin 93 at the left end. These headed pins enter slots 92′ and 93′ in the ends of the rack 91. In the slot 93′ at the left end are lateral notches bearing the gage numerals 1, 2 and 3. The notches on the upper edge of the rack 91 are made to correspond with certain notches in the upper edge of the rack 90, when pin 93 is in gage notch 1 and with other different notches in rack 90 when pin 93 is in the gage notches 2 or 3. The lower edge of rack 91 is also provided with notches which correspond with the lower gage notches 1, 2 and 3 in the same way as the upper notches in the edge of rack 91 correspond with the upper gage notches 1, 2 and 3. The reason for these two sets of notches is that the magazine is intended for location in its socket in a manner to present the sensitized plates horizontally, that is, standing on a long side, in which case the rack 91 holds the position seen in Fig. 1. When the magazine is turned through an angle of ninety degrees, to present the sensitized plates in a vertical position, that is, standing on end, then the rack 91 is to be inverted on its pins 92, 93 in order that its adjustment in accordance with the gage notches will effect the same proportionate division of the exposures upon the sensitized plates as when said plates are in said horizontal position. The limit of movement of slide 24 to the left is determined by the detent 87 dropping into notch 94 on the rack 90. In this position the magazine is directly over the dark box and in position for the discharge of exposed plates.

The positions of the division-curtains may be seen by looking through the focusing-glass 26 and their location determined by scales marked upon the focusing-glass as seen in Fig. 1. The figures of the scale at the right half of said glass are those to be used when the plates are presented in horizontal position, that is, on a side edge, and those on the left half of the focusing-glass are to be used when the plates are presented standing on end. The positions of the division-curtains are also shown on the indicator 95, Fig. 1, in which the upper row of figures provide for the exposures of vertical halves of the plate, the figures of the second row for exposures of the plate in vertical thirds and the figures of the lower row for exposures of the plate in vertical sevenths. To stop the slide 24 in a position such as to bring the plates in the magazine to correspond with the positions of the horizontally moving division-curtains a pointer 96 is attached to the upper edge of frame 24 over the middle of the magazine socket, and the right hand edge (Fig. 1) of this pointer is to be stopped at the desired division on the scale 95, the racks 90 and 91 having been properly adjusted the detent 87 will fall in the appropriate notch to stop and hold the pointer 96 at the division on the scale 95 where it is desired to bring the magazine to rest. A registering-pointer 97 is also provided for coöperation with the scale 95 to show the last preceding stop made by the magazine in its movements to produce a series of vertical exposures. This registering-pointer consists of a projection from a slide 98, Figs. 2, 6 and 7, mounted upon a guide 99 located on the top of the main frame 20. The slide 98 has connected to it a cord 100, which passes along the upper edge of frame 20 and over a pulley 101, Figs. 2 and 7, down to a weight 102 mounted to slide vertically on a rod 103. The slide 98 is normally retained against automatic movement on its guide by the pressure of the scale 95 against it, Fig. 6. This pressure is applied by means of a weight 104, Figs. 2 and 12, mounted upon a vertical rod 105 in the frame 20, which rod at its upper end is connected to a crank-arm 106 journaled in bearings along the upper edge of frame 20, Fig. 1, to the farther end of which the scale 95 is rigidly connected. The lower end of rod 105 is connected to a trap-door 107 located in the slit 29 forming the passage for the exposed plates from the magazine into the dark box, Fig. 13. When this trap-door is swung downwardly by an exposed plate in its descent into the dark box the rod 105 is raised, which acting on the crank-arm 106 throws the scale 95 away from the slide 98, thereby permitting the slide 98, with its registering-pointer 97, to move to the left (Fig. 1) into initial position through the descent of weight 102. The forward movement of the scale 95 also indicates to the operator that the exposed plate due to the manipulation of crank 33 has been discharged from the magazine.

In the manipulation of the division-curtains the shutter indicated in dotted lines at 108 in front of the focusing-glass 26, Fig. 1, is to be open. It is preferably opened and closed automatically. To provide for this a pneumatic cylinder 109, containing a spring-returned piston 110, is located on the under edge of the frame 20, Figs. 1 and 2. From this cylinder a tube 111 extends to a pneumatic trip 112 upon the shutter frame. From the piston 110 there extends a piston-rod provided with a head 113. Depending from the right hand end (Fig. 1) of the slide frame 24 is a projection 114 for striking the head of said piston just before the magazine reaches its discharge position. The inward pressure thereof upon the piston 110 forces air to the trip 112 and opens the shutter. To hold the shutter open a detent 115 is pivoted to the under edge of the frame 20 in position such that its left end (Fig. 1) may be forced in behind the head 113 by the action of the spring 116. Motion due to the spring is limited by the opposite end of the detent 115 striking a stop 117 on a plate secured to the under edge of the frame 20. As the slide frame 24 is moved farther toward the right (Fig. 1) the projection 114 will strike the cam face 118 on the end of the detent 115 and throw said detent out of holding engagement with the head 113 of the pneumatic piston, thereby permitting said piston to be returned by its spring into normal position and permitting the shutter to close. Thus the shutter is automatically closed before the magazine can be brought to the rear of the focusing-glass. Manual means for operating the shutter is also provided as by the bulb 119 connected to a tube forming a prolongation of the tube 111.

Figures 13, 14:
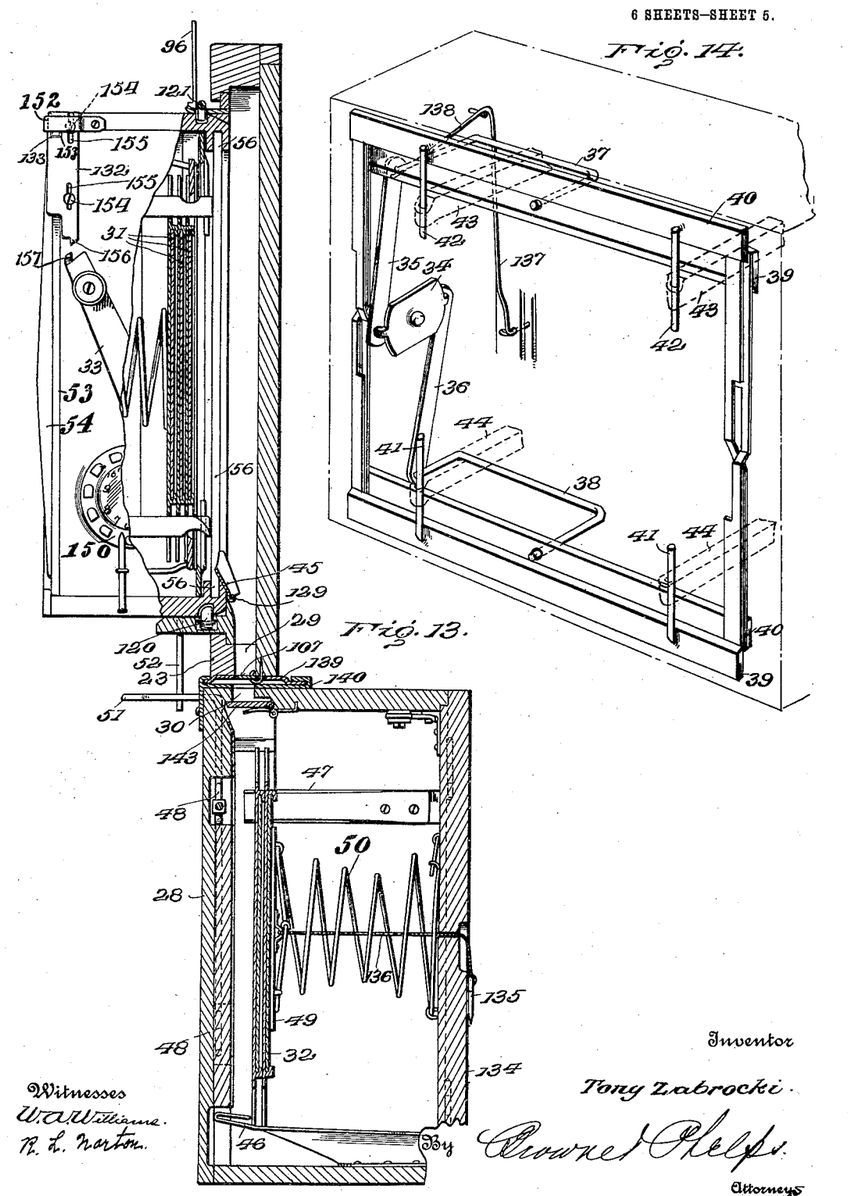
Fig. 13 represents in vertical transverse section, on the line 13—13, Fig. 1, the interior of the dark-box and a portion of the interior of the magazine, part of said magazine being left in elevation.
Fig. 14 represents in perspective the front side of the magazine and a portion of the interior mechanism thereof.
Figures 15, 16, 17:
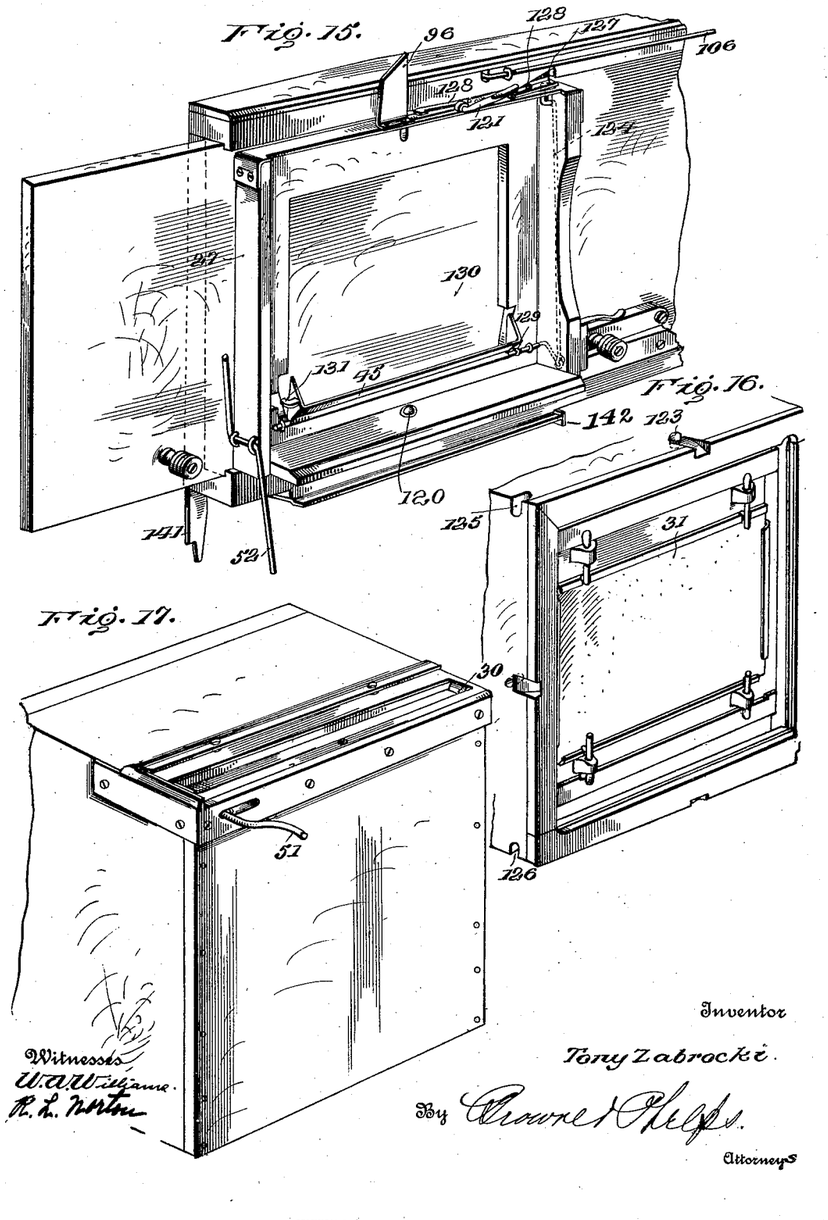
Fig. 15 represents in perspective a portion of the main frame of the device, the magazine being removed to more clearly show the socket therefor.
Fig. 16 is a rear view in perspective of the magazine.
Fig. 17 is a perspective view of the dark-box detached.

It is essential that suitable safeguards be provided against the removal of the magazine when not completely closed and also against the movement of the slide frame, with magazine attached, to the opening 21 when the magazine is closed, and also that the flexible dark slide 53, which closes the front of the magazine, shall be completely open to insure the free discharge of an exposed plate from the magazine to the dark box. To provide for the first one of these essentials, a spring catch 120 is located in the lower part of the magazine socket to take into a suitable notch in the lower edge of the magazine. This catch will permit the free insertion of the lower edge of the magazine, but will prevent its withdrawal except when the upper edge has been first released. Therefore the locks for the magazine are provided at the upper edge of the magazine socket. One of these locks is a manually controlled one and consists of a lever 121 held normally in locking position by spring 122, Figs. 1 and 8. The locking end of the lever 121 passes through the upper part of the magazine socket and into a recess as 123 in the edge of the magazine. To raise this lock out of engagement with the magazine its exposed end is depressed by the finger of the operator. An automatic lock is also provided which is to be controlled by the flexible dark slide 53. This lock consists of a vertical rod 124 mounted in the right portion of the magazine socket, Fig. 15. Its upper end is bent to enter the socket 27 and to enter also said notch 125 in the upper right hand corner (Fig. 1) of the magazine when the plates are exposed when standing on a long side or a notch 126 in the lower left hand corner, Fig. 16, of the magazine when the plates are exposed on end. As will be seen in Fig. 1, the upper end of the rod 124 extends through an opening in the upper side of the magazine socket and engages with the under surface of a detent 127. This detent consists of a plate hinged as seen in Fig. 1 and held down normally by a plate spring 128. The lower end of the rod 124 is connected with a crank-rod 129 (Fig. 15) journaled along the lower edge of the opening 130 within the magazine socket and has rigidly connected thereto the plate-shift or chute 45. The left end of the plate-shift 45 (Fig. 15) has thereon an extension 131, with which one end of the flexible dark slide 53 engages when the slide is moved into closed position. This engagement by said slide forces the upper edge of the plate-shift to the right as seen in Fig. 13 and to the left as seen in Fig. 15; this movement through the action of the crank-rod 129 elevates the rod 124 and in the elevation of rod 124 its locking bend is raised out of the locking notch 125 or 126, as the case may be. Then by raising lock 121 the upper edge of the magazine may be tilted out and the magazine removed from the catch 120 and from the magazine socket. When the flexible dark slide is open the plate-shift 45 drops back and is assisted to drop back by the pressure of the spring 128 upon the detent 127. Therefore with the magazine in place the automatic lock holds it there so long as the said slide is open.

The detent 127 enters a notch 127' in the lower edge of the upper rail 22 of the main frame when the magazine is in discharging position but with the dark slide closed and holds the magazine against being moved to the exposure opening until the dark slide is opened.

Precaution against an attempt to discharge an exposed plate from the magazine into the dark box, before the flexible dark slide has been completely opened, is taken by providing a lock for the shifting crank 33. This lock, Figs. 6 and 13, consists of a plate 132 mounted upon the side of the magazine by means of screws 154 passing through slots 155 in said plate assisted by a keeper 152 for the upper end of said plate. The lower end of plate 132 has a detent 156 for engagement with a corresponding detent 157 upon the free end of the crank 33. In the upper way or groove, in which moves the upper edge of the flexible dark slide, is located a plate spring 133, which normally bows down and has its free end inserted in a slit 153 in the plate 132. Thus said spring holds the plate 132 normally depressed whereby its detent is in engaging position with the corresponding detent on the end of the shifting-crank 33. When the flexible dark slide is completely opened its upper right hand corner (Fig. 1) presses said spring 133 upwardly, thereby raising the plate 132 to disengage the detent thereon from that on the shifting-crank 33. Said crank may then be operated and an exposed plate shifted into the dark box, the tally thereof being kept by the register 150 on the end of the magazine as indicated in Fig. 6.

Figures 2, 3, 4, 5:
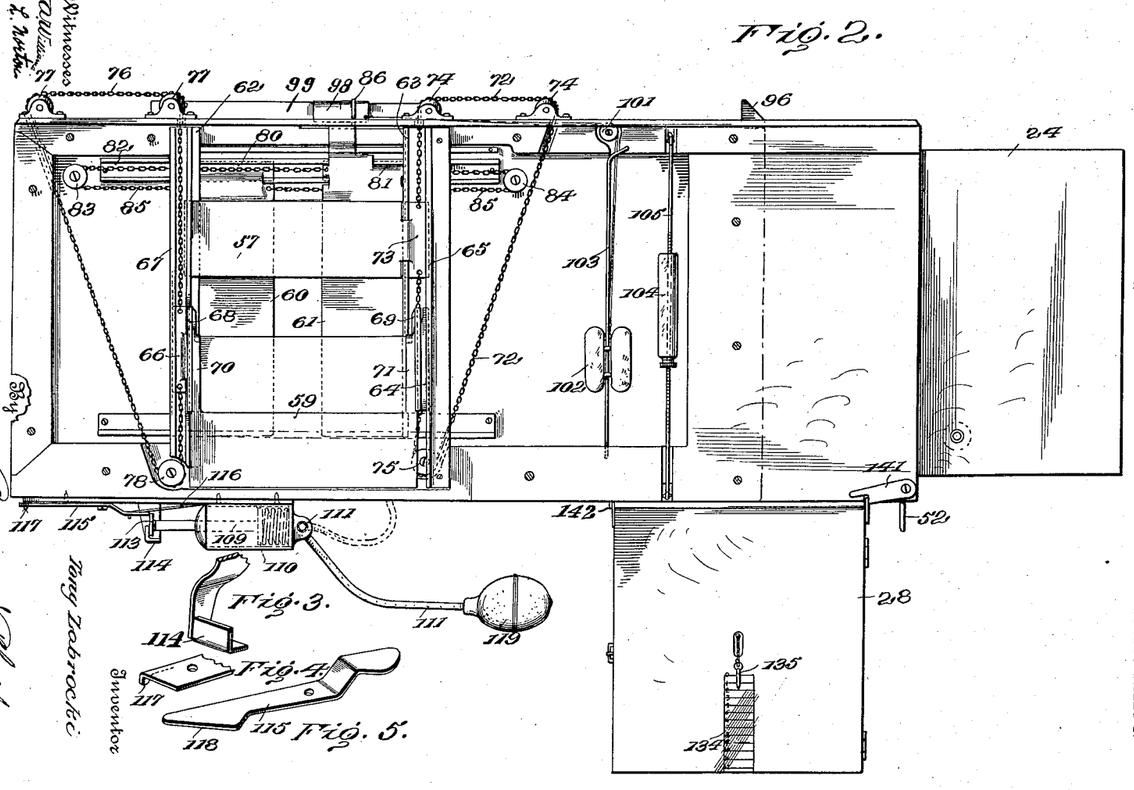
Fig. 2 is an elevation of the reverse side of the device seen in Fig. 1, the cover plate being removed but its right-hand limit being indicated by a broken line.
Figs. 3, 4 and 5 are perspective views in detail of some of the new features of the present invention.

To enable the operator to determine how many exposed plates have been shifted into the dark box a simple index is formed upon the outside of said box as by means of a scale 134, Fig. 2, over which a pointer 135 is moved through its attachment by a cord 136 with the plate 49, against which the exposed plates are held in the dark box. Precaution is also taken in the magazine for holding the back-door 55 of the magazine in closed position. This is effected by a spring 137 secured to the inner face of the right end of the magazine (left end as seen from reversed position in Fig. 14). The free end of this spring passes through the groove at that end of the magazine in which the door 55 is located and by pressing against that edge of the door insures its retention in its grooves, thus maintaining it closed. The other end of the spring-wire from which spring 137 is made is preferably extended at 138 into engagement with the crank-arm 37, thereby acting to maintain the escapement mechanism controlled by the shifting-lever 33 in normal position.

The dark box, as has already been intimated, is removably attached to the lower edge of the main frame 20 and this attachment is effected through a plate 139 connected to the lower edge of the frame 20 and a channel plate 140 connected to the upper edge of the dark box, Fig. 13. The dark box therefore may be slid longitudinally into position, the plate 139 entering the channel plate 140 and it may be held in position by a suitable lock as 141 pivoted to the frame 20, Fig. 2, a stop 142 being provided at the opposite end of the plate 139. The slit in the dark box for the entrance of the exposed plates is closed by a spring-returned trap-door 143, Fig. 13.

In the operation of this improved camera attachment the magazine is loaded with sensitized plates and put in position in its socket with the slide 24 in the position indicated in Fig. 1. The division-curtains are then shifted through the operation of their chains 72 and 76 for the desired number of exposures on the first plate to be presented. The necessary focusing having been completed and the flexible dark slide having been opened the detent 87 is lifted and the slide 24 moved to the right (Fig. 1) to that point determined in accordance with the setting of the division-curtains when said detent will engage the corresponding notch in the rack 91, which has also been shifted to correspond with the setting of the division-curtains. After the desired exposures on the foremost plate in the magazine, the slide 24 is moved to the left (Fig. 1) until detent 87 engages notch 94, which brings the magazine in position for discharging the exposed plates. The dark box may then be slipped into place and by the operation of crank 33 the exposed plate shifted from the magazine to the dark box. In its discharge through the slit controlled by the trap-door 107, the registering-pointer 97 is released and allowed to slide back to initial position, from that position to which it was set through the engagement therewith of pointer 96. The magazine may then be returned to the opening 21 for the exposure of another plate and so on until all the plates have been exposed. Should the flexible dark slide 53, however, be partly closed while the magazine is over the dark box the detent 127 will prevent the slide 24 from being moved to the right (Fig. 1) and the detent on plate 132 will prevent the operation of the crank 33 for the discharge of a plate. Should an attempt be made to remove the magazine before the dark slide is closed it will be found that the automatic lock on rod 124 will prevent it but by closing the slide said lock will be released from the magazine and then by manipulation of the lock 121 the magazine may be tipped outwardly at its upper edge and removed. As has already been stated and as is the case in the magazine attachment forming the subject of the patent already referred to, the return of the magazine from discharging position to exposing position shifts the last plate discharged into the dark box back a step into said box, thereby making room for the next plate, such shifting being effected through the instrumentality of the trip 52 and crank 51.

The invention claimed is:—

1. The combination with the main frame, for the purpose specified, having an exposure opening, of two independently, vertically movable division-curtains for regulating the extent of exposure through said opening, and a third curtain mounted as a rider upon one of said two curtains.

2. The combination with the main frame, for the purpose specified, having an exposure opening, of vertically movable division-curtains and horizontally movable division-curtains located at said opening, flexible connections to said vertically movable curtains extended to the exterior for the manipulation thereof, and means for shifting the horizontally movable curtains simultaneously.

3. In a camera attachment, the combination with vertically and horizontally movable division-curtains, of a focusing-glass provided with a scale thereon by which to locate said curtains.

4. In a camera attachment, the combination with horizontally movable division-curtains, of means for setting them in desired positions, a horizontally movable plate-holder, a scale member by which to locate said plate-holder in position to correspond with the positions of the division-curtains, and an automatic registering-pointer for indicating on said scale member the position of the vertical exposures on a plate in said plate-holder.

5. In a camera attachment, the combination with horizontally movable division-curtains, of means for setting them in desired positions, a horizontally movable plate-holder, a scale member by which to locate said plate-holder in position to correspond with the positions of the division-curtains, an automatic registering-pointer for indicating on said scale member the position of the vertical exposures on said plate, means for discharging a plate from said plate-holder after exposure, and means actuated by the discharged plate for effecting the return of said automatic pointer to initial position with respect to said scale member.

6. In a camera attachment, the combination with horizontally movable division-curtains, of means for setting them in desired positions, a horizontally movable plate-holder mounted at the rear of said curtains, a movably mounted scale member by which to locate said plate-holder, an automatically registering-pointer held in set position by said scale member, and means actuated by the discharge of an exposed plate for moving said scale member to release said pointer.

7. In a camera attachment, the combination with horizontally movable division-curtains, of an adjustable plate-holder, a detent for holding said plate-holder in certain predetermined positions relating to said curtains, and racks provided with series of notches to receive said detent for the purpose set forth.

8. In a camera attachment, the combination with horizontally movable division-curtains, of an adjustable plate-holder, a detent for holding said plate-holder in certain predetermined positions relative to said curtains, a fixed rack provided with notches for said detent, and a supplemental notched rack located adjustably upon the fixed rack to vary the succession of notches with which said detent may engage.

9. In a camera attachment, the combination with horizontally movable division-curtains, of an adjustable plate-holder, a detent for holding said plate-holder in certain predetermined positions relative to said curtains, a fixed rack provided with notches for said detent, and a removable adjustable, supplemental rack for coöperation with the fixed rack and provided with notches along both edges and with gage notches within one end substantially as and for the purpose set forth.

10. In a camera attachment, the combination with a removable magazine provided with lock notches at one or more corners, of an automatic lock for entering said notches, a closure for said magazine, and means whereby said closure may unlock said lock.

11. In a camera attachment, substantially as described, the combination with the main frame of a detachable magazine provided with a flexible dark slide, an automatic lock adapted to be unlocked by said slide, and a plate-shift serving as the intermediary between said slide and said lock.

12. In a camera attachment, substantially as described, the combination with the main frame, of a movable slide carrying a socket, a magazine detachably located in said socket, an automatic lock for holding the magazine in said socket, and a detent for holding said slide in plate discharging position, said detent being releasable through the operation of said lock.

13. In a camera attachment, substantially as described, the combination with the main frame, of a slide movable therein, a magazine having a closure and removably located on said slide, an automatic lock for holding the magazine to the slide, means operable by the closure of said magazine for actuating the automatic lock, and a manual lock for holding the magazine in place on the slide.

14. In a camera attachment, substantially as described, the combination with a removable magazine having a closure, of a removable dark box, the magazine and dark box being provided with registering slots for the passage of exposed plates, a plate-shifting crank on the magazine, a detent for holding the shifting crank against operation, and means controlled by the position of the magazine closure for tripping said detent to release said crank.

15. In a plate-holding magazine having a movable closure for one side and grooves on the end walls thereof at the other side, the combination therewith of a removable door for said other side having its ends located in said grooves, and a spring in one of said grooves for normally maintaining the door in closed position.

16. In a camera attachment, substantially as described, the combination with the main frame, of a pneumatic cylinder connected therewith and provided with a piston, a magazine-carrying slide mounted in said frame and provided with a projection for engagement with said piston, an automatic shutter with its actuator, a tube connecting said cylinder with the shutter actuator, and a detent for holding the piston in the position to which it may be moved by said projection.

17. In a camera attachment, substantially as described, the combination with the main frame, of a pneumatic cylinder connected therewith and provided with a piston, a magazine-carrying slide mounted in said frame and provided with a projection for engagement with said piston, an automatic shutter with its actuator, a tube connecting said cylinder with the shutter actuator, a detent for holding the piston in the position to which it may be moved by said projection, a spring for holding said detent in the path of the piston rod, and a cam projection upon said detent located in the path of the projection from said slide, for the purpose set forth.

In testimony whereof I affix my signature in presence of two witnesses.

TONY ZABROCKI.

Witnesses:
D. E. TAWNEY,
MAUDE R. WHITE.

---

Copies of this patent may be obtained for five cents each, by addressing the "Commissioner of Patents, Washington, D. C."